US012587060B2

(12) United States Patent
Geiling et al.

(10) Patent No.: US 12,587,060 B2
(45) Date of Patent: Mar. 24, 2026

(54) ELECTRIC MOTOR FOR A MOTOR VEHICLE

(71) Applicant: Brose Fahrzeugteile SE & Co. Kommanditgesellschaft, Wuerzburg, Wuerzburg (DE)

(72) Inventors: Christian Geiling, Reichenberg (DE); Daniel Hirsch, Hoechberg (DE); Moritz Obendorfer, Wuerzburg (DE); Patrick Thurmann, Wuerzburg (DE)

(73) Assignee: Brose Fahrzeugteile SE & Co. Kommanditgesellschaft, Wuerzburg, Wuerzburg (DE)

( * ) Notice: Subject to any disclaimer, the term of this patent is extended or adjusted under 35 U.S.C. 154(b) by 203 days.

(21) Appl. No.: 18/208,119

(22) Filed: Jun. 9, 2023

(65) Prior Publication Data

US 2023/0318390 A1     Oct. 5, 2023

Related U.S. Application Data

(63) Continuation of application No. PCT/DE2021/100988, filed on Dec. 9, 2021.

(30) Foreign Application Priority Data

| Dec. 9, 2020 | (DE) | .................... | 10 2020 215 587.9 |
| Dec. 9, 2020 | (DE) | .................... | 10 2020 215 588.7 |
| Feb. 1, 2021 | (DE) | .................... | 10 2021 200 885.2 |

(51) Int. Cl.
*H02K 5/15*          (2006.01)
*H02K 3/52*          (2006.01)
(Continued)

(52) U.S. Cl.
CPC ............. *H02K 5/225* (2013.01); *H02K 3/522* (2013.01); *H02K 5/15* (2013.01); *B60T 13/74* (2013.01);
(Continued)

(58) Field of Classification Search
CPC .......... H02K 5/00; H02K 5/225; H02K 11/33; H02K 5/15; H02K 21/16; H02K 3/522;
(Continued)

(56) References Cited

U.S. PATENT DOCUMENTS 9,041,259 B2 * 5/2015 Palfenier ................ H02K 11/33
                                                              310/43
2015/0229178 A1 8/2015 Murakami et al.
(Continued)

FOREIGN PATENT DOCUMENTS

| DE | 19849669 A1 | 5/2000 |
| DE | 102015200086 A1 | 7/2016 |

(Continued)

OTHER PUBLICATIONS

International Search Report dated May 30, 2022 in corresponding application PCT/DE2021/100988.

*Primary Examiner* — Alexander A Singh
(74) *Attorney, Agent, or Firm* — Muncy, Geissler, Olds & Lowe, P.C.

(57) ABSTRACT

An electric motor for a motor vehicle, in particular for a braking or steering system, comprising a motor housing with a housing cover, and a stator inserted in the motor housing comprising a ring-shaped switching unit, which is arranged on a front side facing the housing cover, wherein at least one spacer element axially protruding in the direction of the housing cover is arranged on the switching unit, wherein the spacer element is designed to be elastic at least in the radial direction and/or the tangential direction.

9 Claims, 7 Drawing Sheets

(51) Int. Cl.
    *H02K 5/22*         (2006.01)
    *B60T 13/74*       (2006.01)
    *B62D 5/04*        (2006.01)

(52) U.S. Cl.
    CPC ........ *B62D 5/0403* (2013.01); *H02K 2203/09*
                                   (2013.01)

(58) Field of Classification Search
    CPC ........ H02K 5/04; H02K 5/24; H02K 2211/03;
                  H02K 2203/09; B60T 13/745; B60T
                                13/74; B62D 5/0403
    USPC ......................................................... 310/89
    See application file for complete search history.

(56)                References Cited

U.S. PATENT DOCUMENTS

| | | | |
|---|---|---|---|
| 2017/0237312 A1 | 8/2017 | Stewart et al. | |
| 2018/0316239 A1 | 11/2018 | Ogawa et al. | |
| 2019/0305625 A1 | 10/2019 | Mao et al. | |
| 2020/0067367 A1 | 2/2020 | Braun et al. | |
| 2020/0177045 A1 | 6/2020 | Kizu et al. | |
| 2020/0195083 A1 | 6/2020 | Ueno et al. | |
| 2020/0313501 A1 | 10/2020 | Asahi et al. | |

FOREIGN PATENT DOCUMENTS

| | | | |
|---|---|---|---|
| DE | 102017205532 A1 | 10/2018 | |
| DE | 102019200616 A1 | 7/2020 | |
| DE | 102019202859 A1 | 9/2020 | |
| EP | 1307370 B1 | 6/2004 | |
| WO | 0079144 A1 | 12/2000 | |

\* cited by examiner

ELECTRIC MOTOR FOR A MOTOR VEHICLE

This nonprovisional application is a continuation of International Application No. PCT/DE2021/100988, which was filed on Dec. 9, 2021, and which claims priority to German Patent Application No. 10 2020 215 587.9, which was filed in Germany on Dec. 9, 2020, and to German Patent Application No. 10 2020 215 588.7, which was filed in Germany on Dec. 9, 2020, and to German Patent Application No. 10 2021 200 885.2, which was filed in Germany on Feb. 1, 2021, and which are all herein incorporated by reference.

BACKGROUND OF THE INVENTION

Field of the Invention

The present invention relates to an electric motor, in particular for a braking or steering system of a motor vehicle. The invention further relates to a stator for such an electric motor.

Description of the Background Art

In a modern motor vehicle, electric motors are used in a variety of ways as drives for different control elements. Electric motors are used, for example, as power window drives, sunroof or seat adjustment drives, as cooler fan drives or as transmission actuators. Furthermore, electric motors are used in particular in steering systems (Electrical Power Steering, EPS) or braking systems (Integrated Braking Systems, IBS).

An electric motor, in particular brushless, as an electric three-phase machine, usually has a stator with a number of, for example, star-shaped stator teeth, which carry an electrical rotating field or stator winding in the form of individual coils, which in turn are wound from an insulated wire. The coils with their coil ends (winding wire ends) are assigned to strands or phases and interconnected with each other in a predetermined manner and fed to phase connections to energize the rotating field winding.

In the case of a brushless electric motor as an electric three-phase machine, the stator has three phases and thus at least three phase conductors or phase windings, each of which is subjected to an electric current in a phase-shifted manner in order to generate a rotating magnetic field in which a rotor provided with permanent magnets rotates. The phase ends of the phase windings are fed to a motor electronics to control the electric motor. The coils of the rotating field winding are connected in a star or delta connection and electrically contacted with the three phase connections.

For guiding and interconnecting the coil ends, for example, switching units are common as interconnection systems or contact devices, which are placed on the stator or on a stator assembly, in particular on the front side. Such switching units are used in particular to connect the coil ends of the coil winding wire sections forming the coil windings in an electrically conductive manner so that individual coil ends are electrically shorted to each other, and thus the coil or phase windings can be energized serially.

Electric motors, in particular drives for braking systems and steering, have a (motor) housing and a (housing) cover. As a rule, an electrically commutated stator is mounted in the motor housing. In engine operation, the excitation of the components causes oscillations or vibrations in the system, which can propagate to the motor housing and/or the housing cover, for example, as structure-borne noise. In particular, in a housing cover designed as a bearing plate, axial vibrations can occur, which can cause unwanted noises and elastic deformations.

Braking systems, for example, are mounted on a bulkhead of the motor vehicle, so that the noise generated during engine operation is absorbed into the passenger compartment. This effect is undesirable in braking systems, especially in autonomously driven or drivable vehicles, because occupants can react particularly sensitively to braking noises that are not caused by the driver.

SUMMARY OF THE INVENTION

It is therefore an object of the present invention to provide a particularly suitable electric motor for a motor vehicle. In particular, axial vibrations and an influence of the housing cover or bearing plate on the acoustic performance of the electric motor are to be reduced. A further object of the invention is to specify a particularly suitable stator for such an electric motor.

The electric motor according to the invention can be provided for a motor vehicle, in particular for a braking or steering system of a motor vehicle and is suitable and equipped for this purpose. The motor vehicle may, for example, be an autonomously driven or drivable motor vehicle.

For example, the electric motor can have a pot-shaped motor housing, which is covered or can be covered by a housing cover on the front side. The housing cover is preferably designed as a bearing plate. In the following, the housing cover is therefore also referred to as the bearing plate, wherein the following versions can also be transferred mutatis mutandis to other housing covers without loss of generality.

The electric motor can have a stator, in particular an electrically commutated stator, which is inserted in the motor housing. The stator has a switching unit (connection unit, contact unit) mounted on the front side. The ring-shaped switching unit is used for contacting and interconnecting a multiphase stator winding, which is applied, for example, to stator teeth of a stator packet.

According to the invention, at least one axially protruding spacer element can be arranged on the switching unit in the direction of the housing cover, which is designed to be elastic at least in the radial and/or tangential direction. As a result, a particularly suitable electric motor has been realized.

The conjunction "and/or" can be understood here and in the following in such a way that the features linked by means of this conjunction can be formed both together and as alternatives to each other.

The oscillation or vibration movements on the housing cover occurring during operation are thus calmed by at least one elastically designed spacer element with the highest possible internal damping. For this purpose, the spacer element is arranged between the switching unit and the bearing plate. The axially oriented spacer element preferably supports the housing cover or the bearing plate in relation to the switching unit, whereby oscillations or vibrations of the housing cover are dampened or calmed.

In this and the following, "axial" or "axial direction" can be understood to mean, in particular, a direction parallel (coaxial) to the axis of rotation of the electric motor, that is, perpendicular to the end faces of the stator. Correspondingly, here and in the following, "radial" or "radial direction", in particular, are meant to be a direction oriented perpendicular (transverse) to the axis of rotation of the electric motor along a radius of the stator or the electric motor. The term "tangential" or "tangential direction" is understood here and in the following to mean in particular a direction along the circumference of the stator or electric motor (circumferential direction, azimuthal direction), i.e., a direction perpendicular to the axial direction and the radial direction.

The invention improves the acoustic performance of the electric motor. Furthermore, there are essentially no additional costs since the spacer element or its geometry can be executed comparatively easily and cost-effectively.

The spacer element can be flexibly adapted to customer-specific requirements or needs (material, diameter, opening, etc.). In particular, a targeted influence on the acoustic behavior is made possible by adapting the type of support to the application-specific (frequency, distortion) requirement of the electric motor.

Preferably, the spacer element is disposed as close as possible in the radial direction on the longitudinal axis (axis of rotation) of the electric motor in order to minimize axial vibrations of the bearing plate. The spacer element can also be applied several times to the same circle diameter or radially different positions. In other words, a number of spacing elements are possible, which are radially and/or tangentially distributed. The stiffness of the support can be adjusted by selecting the material, the size of the element, the number of elements and the choice of the pitch circle diameter.

In an advantageous design, the housing cover can be elastically supported by the spacing element. As a result, oscillations and vibrations that occur during engine operation—and thus noise formation/generation—are reliably reduced or dampened. Furthermore, the service life of the bearings, which are attached to the bearing plate, is increased.

The spacer element may, for example, be a component designed separately from the switching unit. It is also conceivable that the spacer element is part of a contact adapter or customer plug, which can be coupled to the stator and/or the switching unit.

For example, the switching unit and the spacer element can be designed as a two- or multi-component injection molded part. For example, the spacer element is designed as a plastic element or plastic body and is preferably an integral part of the switching unit or the contact adapter. In particular, the spacer element can be attached, molded or injected on the switching unit as a plastic dome.

The spacer element can be molded in one piece, i.e., integrally or monolithically, on the switching unit. Thus, the spacer element is part of the switching unit. As a result, no additional parts are required for the assembly of the electric motor, which simplifies the production of the electric motor. The switching unit, and thus the spacer element, can be manufactured, for example, as a common injection-molded part made of glass fiber reinforced polyamide, for example PA6-GF30.

The spacer element can rest on the housing cover with its free-end side. In particular, the spacer element rests directly on the housing cover.

For mounting the housing cover or the bearing plate, this is pressed into the motor housing, for example (press-fit connection). This means that the spacer element is subjected to at least some mechanical pretensioning or preload when mounted. In other words, the elastically designed spacer element is compressed between the switching unit and the bearing plate in the radial and/or tangential direction, and thus elastically deformed, at least in sections. While the bearing plate is fixed in the motor housing, tolerance compensation can thus take place by means of elastic deformation or the spacer element. For this tolerance compensation, the spacer element may have a shape or geometry intended for that purpose, with which the reaction force is transmitted to the bearing plate. This ensures the effect in all positions within tolerance limits. In other words, the elastically designed spacer element acts as a pre-tensioning element for fixing the housing cover.

For example, the geometry of the spacer element can be an opening (slot) in the radial direction or an opening in the tangential direction. In other words, the spacer element has, for example, a radial slotting (for a symmetrical deformation) or a tangential slotting (for asymmetrical deformation) for elastic deformation.

The housing cover can have a stepped offset on which the spacer element rests on the free-end side. Here, a stepped offset is an offset in the axial direction in the form of a double buckling structure. In the case of an axial load, the free end of the spacer element slides along the step of the housing cover and is bent here in particular in the radial direction.

The spacer element can have an axially protruding column body with a free-end tip. The column body has a round or polygonal, especially rectangular, cross-sectional shape in a radial and tangential intersectional plane. In the case of a rectangular cross-sectional shape, the short sides of the spacer element are essentially oriented in the radial direction, wherein the long sides are essentially oriented in the tangential direction. The spacer element thus exhibits greater mechanical rigidity in the tangential direction, so that it is bent or deflected under load, especially in the radial direction.

The free-end tip has a suitable geometry to control the elastic deformation and to exert the (preload) force on the bearing plate. In a conceivable design, the tip preferably has a roughly nose-shaped cross-sectional plane in an axial and radial cutting plane with two different pitches as a contact surface for the housing cover. In other words, there is a kink in the contact surface. This means that two partial contact surfaces with different pitches or inclinations are formed. In particular, the two pitches realize a targeted or controlled deformation or bending of the spacer element in the course of an axial load.

The diameter of the spacer element can change along the axial direction. The diameter can change in sections or over the entire axial height of the spacer element. As a result, the spacer element can be adapted particularly flexibly. In a suitable further development, the diameter of the spacer element tapers along the axial direction, especially in the radial and/or tangential direction. In other words, the spacer element has a front and/or side taper, for example, in the direction of the housing cover.

The stator of the invention is suitable and configured for an electric motor described above. The stator has a switching unit with at least one axially protruding spacer element, which is designed to be elastic at least in the radial and/or tangential direction.

Further scope of applicability of the present invention will become apparent from the detailed description given hereinafter. However, it should be understood that the detailed description and specific examples, while indicating preferred embodiments of the invention, are given by way of illustration only, since various changes, combinations, and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
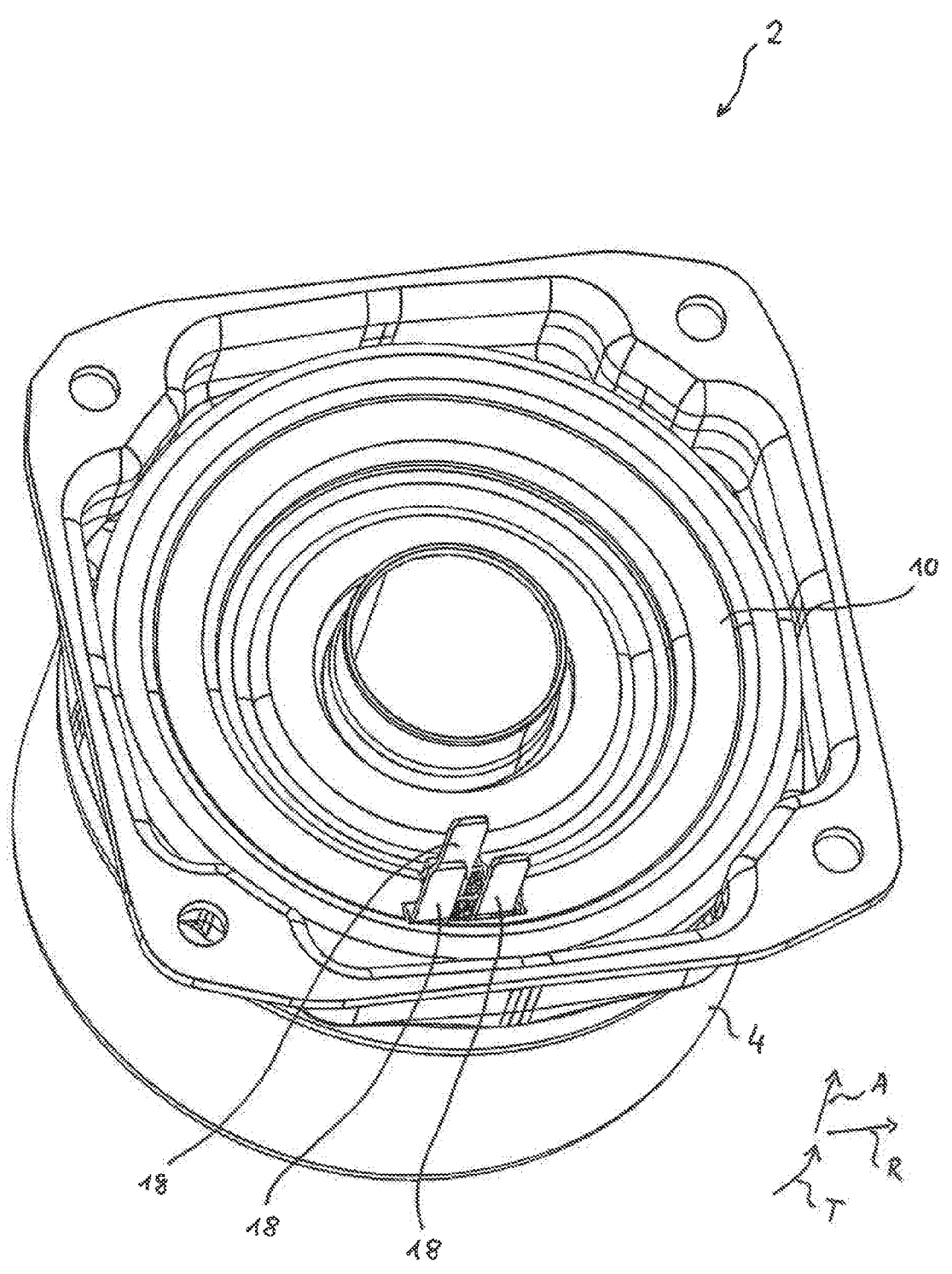
FIG. 1 shows, in a perspective view, an electric motor of a braking system 6 with a motor housing and a bearing plate.

FIG. 1 shows an electric motor 2 of an unspecified braking system. The electric motor 2 has a pot-shaped motor housing 4 in which a stator 6 (FIG. 11) with a switching unit 8 is inserted. The motor housing 4 is closed at the front side by means of a bearing plate as housing cover 10. During operation, oscillations and vibrations of the housing cover 10 may occur, especially along an axial direction A. In the figures, the axial direction is denoted by A, wherein the tangential direction is denoted by T and the radial direction by R.

The electric motor 2, in particular brushless, comprises an unspecified rotor, which is non-rotatably coupled to a motor shaft. The rotor is rotatably arranged inside the stator 6. The stator 6 comprises a stator assembly 12, for example a laminate stack, with twelve inward-facing stator teeth 14 to which a stator or rotating field winding of the electric motor 2 is applied.

For example, the rotating field winding is wound on the stator teeth 14 in the form of coils. The coil ends 16 of the (single) coils are connected to the 3-phase stator or rotating field winding in the present embodiment by means of the switching unit 8 placed on the front side of the stator 6. The axial coil ends 12 are connected by means of the switching unit 8 with three phase connections 18. For this purpose, a punched grid is integrated in the switching unit 8, which is contacted or connected with the coil ends 12 at contact lugs 16.

The wiring of the coil ends 14 is carried out in particular by means of a punched grid, which is embedded in a ring-shaped base body 20 of the switching unit 8. The punched grid protrudes from the base body 20 by means of contact lugs 22, wherein the contact lugs 22 are contacted, for example welded or soldered, with the coil ends 16. The coil ends 16 and contact lugs 22 are only exemplified with reference signs in the figures.

Figure 2:
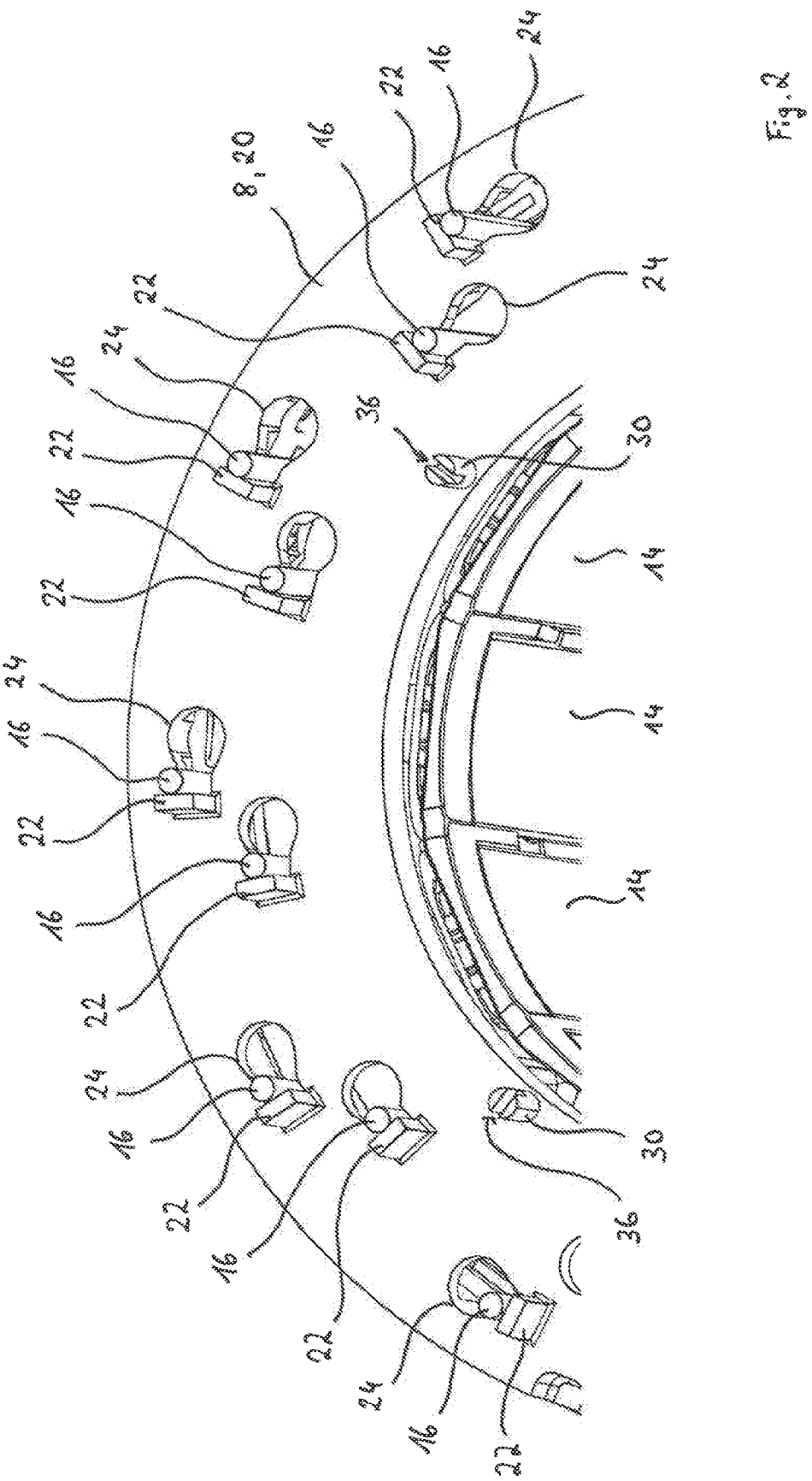
FIG. 2 shows, in a perspective view, in part a switching unit of a stator with a spacer element in a first embodiment.
Figure 3:
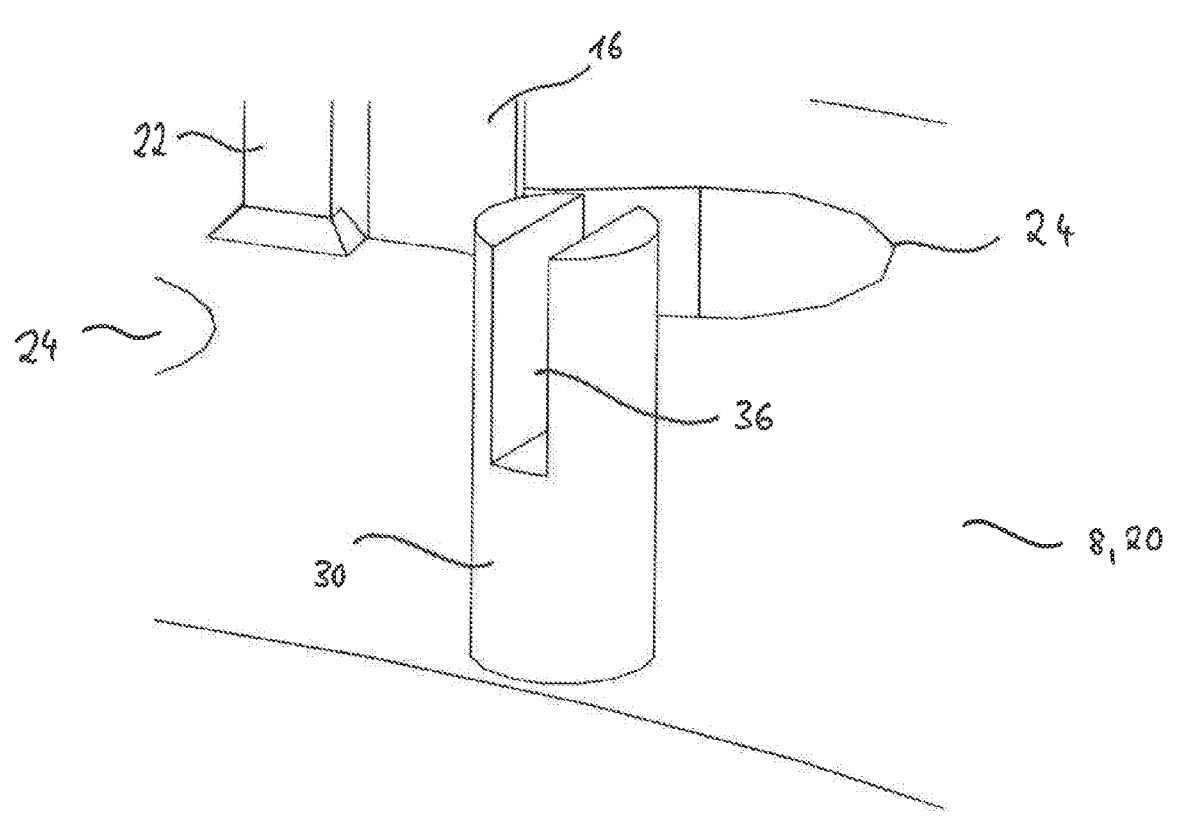
FIG. 3 shows, in a perspective view, the spacer element.
Figure 4:
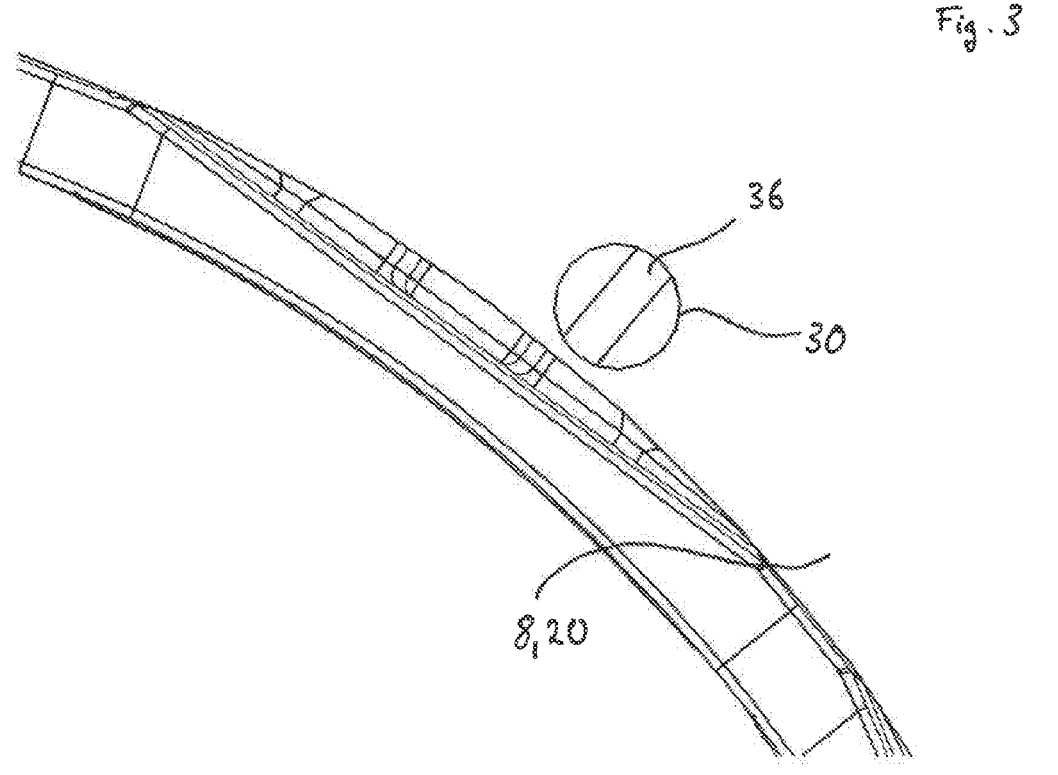
FIG. 4 shows, in a top view, the spacer element.

As is fairly clear in the illustration of FIG. 2, the coil ends 16 of the coils are passed through radially inner axial feed-through openings 24 of the base body 20 and are contacted with the contact lugs 22 on the upper side of the base body 20 facing the housing cover 10.

The switching unit 8 is form and/or force-fittingly attached or attachable by means of axial locking tongues 26 of the base body 20 to the stator assembly 12. The locking tongues 26 are distributed along the outer circumference and arranged on the side of the base body 20 facing the stator assembly 12. In this case, the stator assembly 12 has grooves 28 running axially along its outer circumference, which are provided with reference signs in the figures only as examples, in which the locking tongues 26 engage in a clamping manner for fastening. The switching unit 8 is thus non-destructively latched or clamped to the stator assembly 12.

In order to dampen or reduce the oscillations and vibrations of the housing cover 10, at least one spacer element 30 is provided, which is arranged between the housing cover 10 and the switching unit 8. The spacer element 30 is designed to be elastic or flexible at least in the tangential direction T and/or in the radial direction R.

In the following, a first exemplary embodiment for the spacer element is described on the basis of FIGS. 2 to 8.

For example, the cylindrical or bolt-shaped spacer element 30 is preferably designed as a plastic body, which forms a common component with the switching unit 8. Preferably, a number of spacer elements 30 are provided on the base body 20, which are radially and/or tangentially distributed.

The spacer element 30 is arranged on an inner circumference of the ring-shaped switching unit 8, i.e., in the radial direction R as close as possible to the longitudinal axis (axis of rotation) of the electric motor 2, in order to minimize or reduce axial vibrations of the housing cover 10 as effectively as possible. The spacer element 30 of the switching unit 8, on the free-end side, is in direct contact with the housing cover 10 when mounted.

For example, to mount the housing cover 10, it is pressed into the motor housing 4 (press-fit connection). As a result, the elastic spacer element 30 is compressed between the switching unit 8 and the bearing plate 10 and thus elastically deformed, at least in sections. Due to the elastic deformation or bending of the spacer element 30, a certain preload force is exerted on the housing cover 10.

The spacer element 30 has a specific geometry to control the elastic deformation and to exert the (counter/reset) force on the housing cover 10. While the housing cover 10 is fixed in the housing 4, tolerance compensation is preferably carried out due to the elastic deformation of the spacer element 30.

This geometry is embodied in the embodiments of FIG. 3 to FIG. 8 as a free-end side opening or slot 36. The slot 36 substantially completely intersperses the free end of the spacer element 30 along a transverse direction, so that the free end on the bearing plate side is roughly U-shaped in cross section. The slot 36 can be oriented in the radial direction R (FIG. 5a) or in the tangential direction T (FIG. 5b). In other words, for elastic deformation, the spacer element 30 has a radial slotting for symmetrical deformation or a tangential slotting for asymmetric deformation.

Figures 5A, 5B, 6, 7, 8:
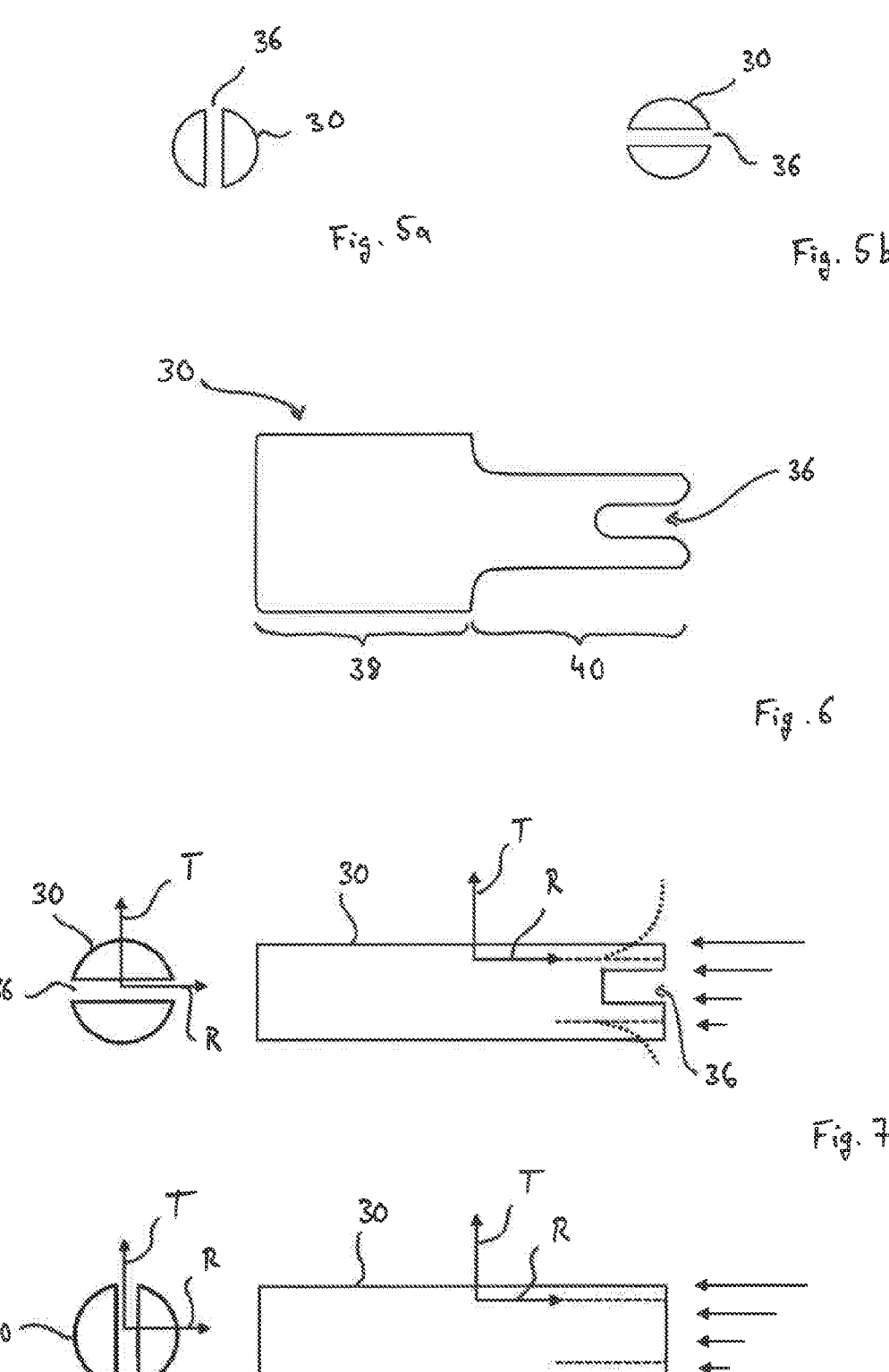
FIGS. 5a and 5b show, in a top view, the spacer element with a radial and a tangential opening.
FIG. 6 shows, in a sectional view, the spacer element.
FIG. 7 is a diagram of the deformation forces in a tangential opening.
FIG. 8 is a diagram of the deformation forces in a radial opening.

FIG. 6 shows a cross-sectional representation of the spacer element 30. The spacer element 30 has a first section 38, which is preferably integrated in the switching unit 8. The section 38 forms the fixed end of the spacer element 30. The first section 38 is followed in the axial direction A by a one-piece, i.e. integral or monolithic, second section 40, which protrudes axially from the switching unit 8 and comprises the slotted free end.

As can be seen in the diagrams of FIGS. 7 and 8, the orientation of the slot 36 affects the deformation properties of the spacer element 30 under axial loading. FIGS. 7 and 8 show schematically an axial force by means of arrows. In the case of a radial slot 36 (FIG. 8), in particular, a symmetrical deformation of the spacer element 30 takes place in the course of an axial load by an oscillating/vibrating housing cover 10, wherein in the case of a tangential slot 36 (FIG. 7) in particular an asymmetrical deformation is caused. The deformation is shown in FIGS. 7 and 8 by means of dashed and dotted lines.

Figure 9:
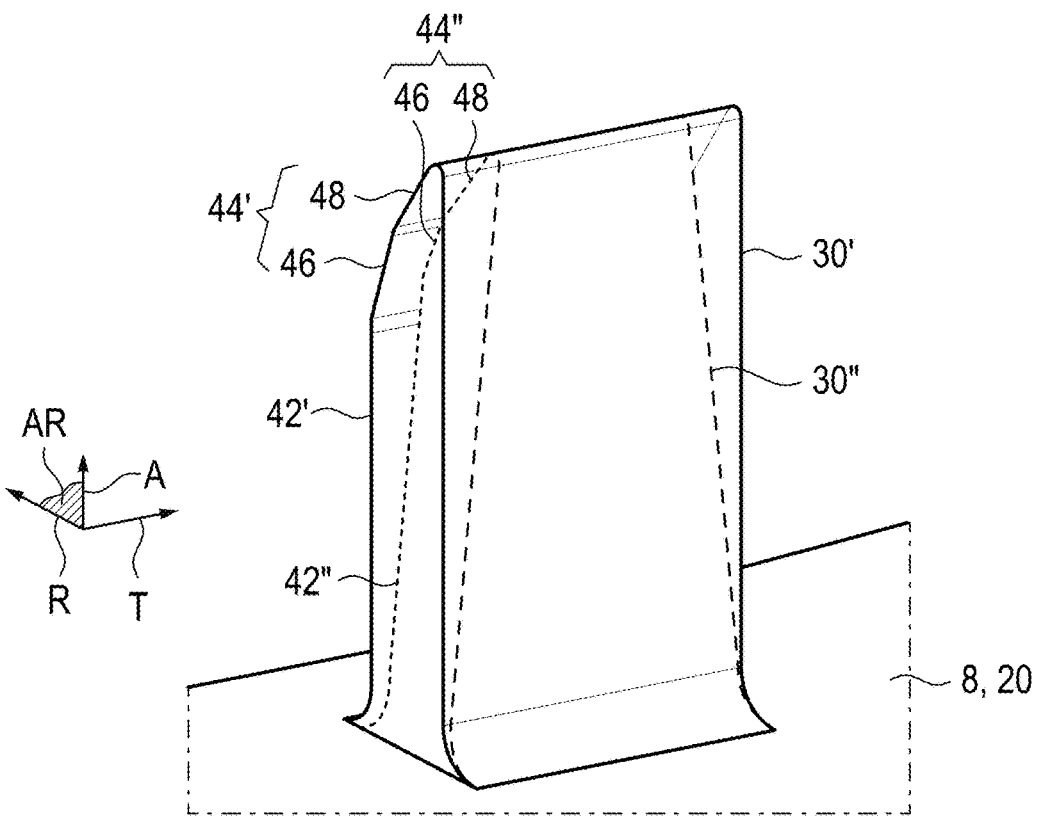
FIG. 9 shows, in a perspective view, the spacer element in a second and third embodiment.

FIG. 9 shows a second and third embodiment of the spacer element 30', 30". The spacer elements 30', 30" are shown superimposed on each other. The spacer element 30' is shown with solid lines, and the spacer element 30" is dashed.

The spacer elements 30', 30" each have a column body 42', 42" protruding vertically from the base body 20, to which a free-end tip 44', 44" is molded. In this embodiment, the column bodies 42', 42" each have a rectangle cross-sectional shape in a radial and tangential section plane RT. The short sides of the spacer elements 30', 30" are essentially oriented in the radial direction R, whereas the long sides of the spacer elements 30', 30" are essentially oriented in the tangential direction T.

The free-end tip 44', 44" has, in an axial and radial section plane AR, a roughly nose-shaped cross-sectional shape with two different pitches as a contact surface for the housing cover 10. In other words, the contact surface has two partial contact surfaces 46, 48 with different pitches or inclinations with respect to the axial direction A. The lower partial contact surface 46, i.e., the one closer to the base body 20, has a greater pitch or inclination towards the axial direction A than the upper partial contact surface 48.

The spacer element 30" differs from the spacer element 30' in particular in that the diameter of the spacer element 30" changes along the axial direction A. In other words, the spacer element 30', in contrast to the spacer element 30", has a column body 42' with a constant diameter along the axial direction A. As can particularly be seen in FIG. 9, the diameter of the spacer element 30" tapers along the axial direction A, in particular in the tangential direction T. For example, the spacer element 30" has a (tangential) lateral taper of approximately 5°, which extends over the entire axial height of the spacer element 30", i.e., over the column body 42" and the tip 44". Furthermore, the spacer element 30" has a (radial) front taper, so that the radial thickness of the spacer element 30" is tapered towards the tip 44". For example, in the case of a spacer element 30" about 6 mm high, the radial diameter of 1.0 mm in the area of the switching unit 8 is reduced to approximately 0.72 mm to the base of the tip 44" or to the partial contact surface 46. As a result, the spacer element 30" is more flexible than the spacer element 30'.

Figure 10:
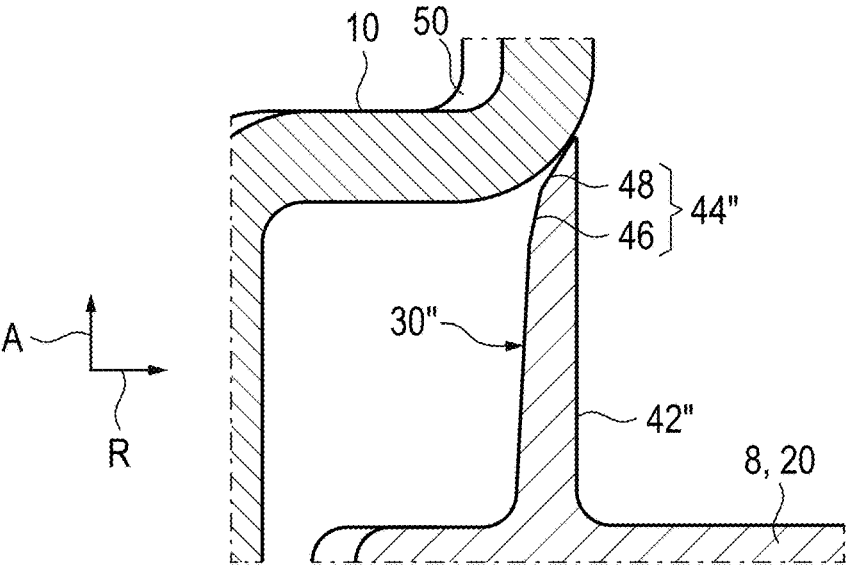
FIG. 10 shows, in a sectional view, the spacer element with the housing cover.

For example, in the embodiment of FIG. 10, the housing cover 10 is elastically supported by the spacer element 30". The housing cover 10 has, for example, a stepped offset 50 on which the spacer element 30" rests on the free-end side with the tip 44". When mounted, the spacer element 30" is in contact with the upper contact surface 48 under a certain preload at the lower bend of the offset 50 of the housing cover 10. In the case of an axial load, at which the axial distance between the switching unit 8 and the housing cover 10 is reduced, the spacer element 30" first slides along the offset 50 with the partial contact surface 48, and is deflected or bent in the radial direction R. As the load increases or the axial distance is reduced, the spacer element 30" with the partial contact surface 46 on the offset 50, and is successively bent more strongly in the radial direction R.

Figure 11:
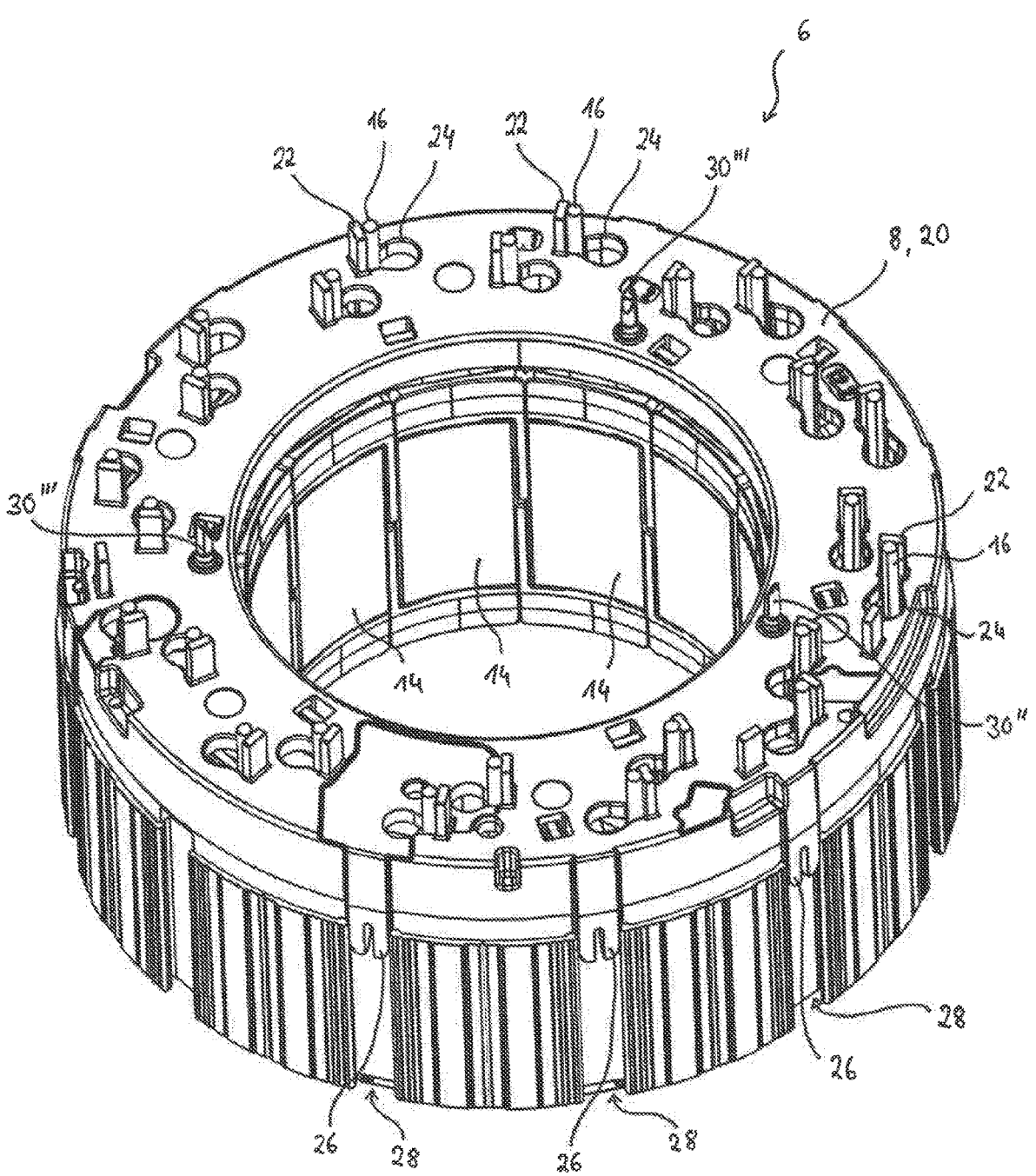
FIG. 11 shows, in a perspective view, a stator of the electric motor with a spacer element in a fourth embodiment.
Figures 12, 13:
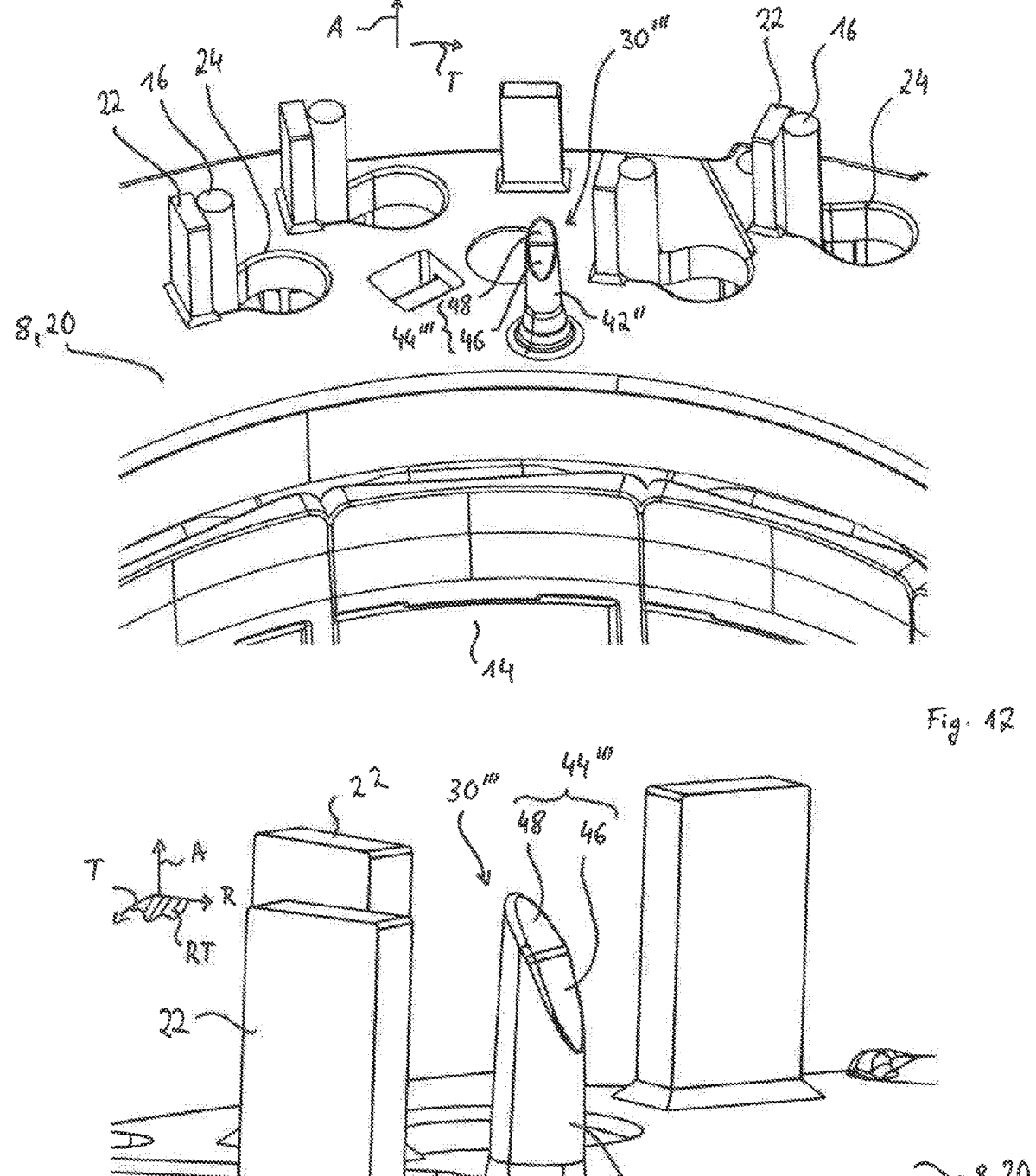
FIGS. 12 and 13 show, in a perspective view, the stator in part.

A fourth exemplary embodiment of the spacer element 30''' is described below on the basis of FIGS. 11 to 13. As can be seen comparatively clearly in FIG. 11, three spacer elements 30''' are molded in one piece on the base body 20 of the switching unit 8 by way of example. The spacer elements 30''' are evenly distributed around the central ring opening of the base body 20.

In this embodiment, the spacer element 30''' has a circular cross-sectional shape in a radial and tangential section plane RT. In a conceivable embodiment, the column body 42''' and the tip 44''' of the spacer element 30''' taper axially in the radial direction and/or in the tangential direction T.

The invention as claimed is not limited to the embodiments described above. Rather, other variants of the invention can also be derived from it by those skilled in the art within the scope of the disclosed claims without departing from the subject-matter of the claimed invention. In particular, all the individual features described in connection with the various embodiments can also be combined in other ways within the scope of the disclosed claims without departing from the subject-matter of the claimed invention.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. An electric motor for a motor vehicle, in particular for a braking or steering system, the electric motor comprising:
   a motor housing with a housing cover; and
   a stator arranged in the motor housing;
   a ring-shaped switching unit arranged on a front side facing the housing cover; and
   at least one axially protruding spacer element arranged on the switching unit in the direction of the housing cover, the spacer element being elastic at least in a radial direction and/or a tangential direction,
      wherein the spacer element is a column body with a tip on its free-end side, and
      wherein the tip has a contact surface for the housing cover, and wherein the contact surface has two different pitches.

2. The electric motor according to claim 1, wherein the spacer element elastically supports the housing cover.

3. The electric motor according to claim 1, wherein the spacer element is molded to the switching unit in one piece.

4. The electric motor according to claim 1, wherein the spacer element is attached to the housing cover with its free-end side.

5. The electric motor according to claim 1, wherein the housing cover has a stepped offset on which the spacer element rests with its free-end side.

6. The electric motor according to claim 1, wherein a diameter of the spacer element changes along the axial direction.

7. The electric motor according to claim 6, wherein the diameter of the spacer element tapers along the axial direction in the radial direction and/or the tangential direction.

8. A stator for the electric motor according to claim 1, the stator comprising the ring-shaped switching unit with the at least one axially protruding spacer element, the least one axially protruding spacer element is configured to be elastic at least in the radial direction and/or the tangential direction.

9. An electric motor for a motor vehicle, in particular for a braking or steering system, comprising a motor housing with a housing cover;

a stator provided within the motor housing;

an annular switching unit arranged on an end face facing the housing cover, wherein an at least one spacer element is arranged on the annular switching unit, where the at least one spacer element projects axially upwards in the direction of the housing cover and exerts a prestressing force on the housing cover through elastic deformation or bending, wherein the at least one spacer element is cylindrical or bolt-shaped and has a slot on the free end for elastic deformation, wherein the slot extends transversely through the free end and substantially intersperses the free end of the at least one spacer element along a transverse direction, so that the free end on a bearing plate side is roughly U-shaped in cross section, and wherein the spacer element has an elastic design and is oriented at least in the radial direction and/or tangential direction.

\* \* \* \* \*